United States Patent
Bremen et al.

(10) Patent No.: US 10,263,958 B2
(45) Date of Patent: Apr. 16, 2019

(54) INTERNET MEDIATION

(71) Applicant: Nominum, Inc., Redwood City, CA (US)

(72) Inventors: Brandon Bremen, San Francisco, CA (US); Erik Bremen, San Francisco, CA (US); Jonathan P. Wood, San Francisco, CA (US); Robert Thomas Halley, Redwood City, CA (US); Tom C. Tovar, San Francisco, CA (US)

(73) Assignee: Nominum, Inc., Redwood City, CA (US)

( * ) Notice: Subject to any disclaimer, the term of this patent is extended or adjusted under 35 U.S.C. 154(b) by 0 days.

(21) Appl. No.: 14/943,908

(22) Filed: Nov. 17, 2015

(65) Prior Publication Data

US 2016/0072847 A1 Mar. 10, 2016

Related U.S. Application Data

(63) Continuation-in-part of application No. 12/727,001, filed on Mar. 18, 2010, now Pat. No. 9,191,393.

(51) Int. Cl.
*G06F 17/00* (2006.01)
*H04L 29/06* (2006.01)
(Continued)

(52) U.S. Cl.
CPC ........ *H04L 63/0281* (2013.01); *G06F 21/305* (2013.01); *G06Q 30/06* (2013.01);
(Continued)

(58) Field of Classification Search
None
See application file for complete search history.

(56) References Cited

U.S. PATENT DOCUMENTS

| 6,108,703 A | 8/2000 | Leighton et al. |
| 6,233,618 B1 | 5/2001 | Shannon |

(Continued)

OTHER PUBLICATIONS

GetSatisfaction.com, "Why does 'the token URL has not been whitelisted' message display when trying to signup or log in?", Retrieved: Feb. 9, 2015, Published: Nov. 11, 2010; available at: https://getsatisfaction.com/getsatisfaction/topics/why_does_the_token_url_has_not_been_whitelisted_message_display_when_trying_to_signup_or_log_in.

(Continued)

*Primary Examiner* — Kambiz Zand
*Assistant Examiner* — Arezoo Sherkat

(57) ABSTRACT

A system for mediating Internet service includes a DNS server and a DNS policy engine associated with the DNS server. The DNS policy engine can be configured to apply one or more DNS policies selected by the DNS policy engine to DNS queries received by the DNS server from a client, analyze the DNS query based on predetermined criteria, and based on the analysis, and selectively redirect a data request associated with the client to a proxy server for further mediation. The system can further include a proxy server and a proxy policy engine associated with the proxy server. The proxy policy engine can be configured to apply one or more proxy policies selected by the proxy policy engine to at least one of data requests received by the proxy server from a client and data responses returned to the proxy server from an IP address.

15 Claims, 7 Drawing Sheets

(51) Int. Cl.
  *G06F 21/30*  (2013.01)
  *G06Q 30/06*  (2012.01)
  *H04L 29/08*  (2006.01)

(52) U.S. Cl.
  CPC ........ *H04L 63/0236* (2013.01); *H04L 63/102* (2013.01); *G06F 2221/2141* (2013.01); *H04L 67/02* (2013.01)

(56) References Cited

U.S. PATENT DOCUMENTS

| | | |
|---|---|---|
| 6,336,117 B1 | 1/2002 | Massarani |
| 7,191,332 B1 | 3/2007 | Pankajakshan et al. |
| 7,240,100 B1 | 7/2007 | Wein et al. |
| 7,254,626 B1* | 8/2007 | Kommula .......... H04L 67/1008 709/217 |
| 7,584,301 B1* | 9/2009 | Joshi .......... H04L 67/1002 709/203 |
| 7,591,002 B2 | 9/2009 | Shelest et al. |
| 7,730,187 B2 | 6/2010 | Raciborski et al. |
| 8,583,801 B2 | 11/2013 | Wyatt et al. |
| 8,583,806 B2 | 11/2013 | Fleischman et al. |
| 8,606,926 B2 | 12/2013 | Ulevitch et al. |
| 8,631,489 B2 | 1/2014 | Antonakakis et al. |
| 8,676,989 B2 | 3/2014 | Treuhaft et al. |
| 8,694,642 B2 | 4/2014 | Dempsky et al. |
| 8,826,443 B1* | 9/2014 | Raman .................. G06F 11/004 726/26 |
| 8,972,580 B2 | 3/2015 | Fleischman |
| 8,984,581 B2* | 3/2015 | Luna .......... G06F 21/554 726/1 |
| 9,026,597 B1 | 5/2015 | Emigh et al. |
| 9,191,393 B2 | 11/2015 | Tovar |
| 9,319,381 B1 | 4/2016 | Jones et al. |
| 9,467,461 B2 | 10/2016 | Balderas |
| 9,654,579 B2 | 5/2017 | Stevens et al. |
| 9,667,747 B2 | 5/2017 | Shotton et al. |
| 9,742,811 B2 | 8/2017 | Lemon et al. |
| 2001/0015965 A1 | 8/2001 | Preston et al. |
| 2002/0169865 A1 | 11/2002 | Tarnoff |
| 2003/0014659 A1 | 1/2003 | Zhu |
| 2003/0028622 A1 | 2/2003 | Inoue et al. |
| 2003/0065942 A1 | 4/2003 | Lineman et al. |
| 2003/0123465 A1 | 7/2003 | Donahue |
| 2003/0200442 A1 | 10/2003 | Bhat et al. |
| 2004/0103318 A1 | 5/2004 | Miller et al. |
| 2004/0111519 A1* | 6/2004 | Fu .................. H04L 63/0218 709/229 |
| 2005/0022229 A1 | 1/2005 | Gabriel et al. |
| 2005/0105513 A1* | 5/2005 | Sullivan .......... H04L 29/12066 370/352 |
| 2005/0277445 A1 | 12/2005 | Bae |
| 2006/0136595 A1 | 6/2006 | Satyavolu |
| 2006/0173793 A1 | 8/2006 | Glass |
| 2007/0118669 A1 | 5/2007 | Rand et al. |
| 2007/0143827 A1* | 6/2007 | Nicodemus ......... G06F 21/6218 726/2 |
| 2007/0220145 A1 | 9/2007 | Kozakura et al. |
| 2007/0294419 A1 | 12/2007 | Ulevitch |
| 2008/0155067 A1* | 6/2008 | Rivera ................ H04L 63/0227 709/220 |
| 2008/0208868 A1 | 8/2008 | Hubbard |
| 2008/0209057 A1 | 8/2008 | Martini et al. |
| 2009/0100513 A1 | 4/2009 | Coburn |
| 2009/0157889 A1* | 6/2009 | Treuhaft .......... H04L 29/12066 709/230 |
| 2009/0164597 A1 | 6/2009 | Shuster |
| 2009/0182843 A1* | 7/2009 | Hluchyj .............. H04L 67/2804 709/219 |
| 2010/0031338 A1* | 2/2010 | Poore .................. H04L 12/1818 726/12 |
| 2010/0131646 A1* | 5/2010 | Drako ............... H04L 29/12066 709/225 |
| 2010/0154024 A1 | 6/2010 | Boxmeyer et al. |
| 2011/0231927 A1 | 9/2011 | Tovar |
| 2012/0054266 A1* | 3/2012 | Kazerani ............. H04L 41/5067 709/203 |
| 2012/0254996 A1* | 10/2012 | Wilbourn ............ H04L 61/1511 726/22 |
| 2015/0058488 A1* | 2/2015 | Backholm ........... H04L 61/1511 709/226 |
| 2015/0288721 A1 | 10/2015 | Lemon et al. |
| 2015/0365441 A1 | 12/2015 | Lemon et al. |
| 2017/0331788 A1 | 11/2017 | Lemon et al. |

OTHER PUBLICATIONS

Contavalli et al., Client IP information in DNS requests draft-vandergaast-edns-client-ip-00, Jan. 26, 2010, 20 pages.
Non-Final Office Action, dated Sep. 21, 2012, U.S. Appl. No. 12/727,001, filed Mar. 18, 2010.
Final Office Action, dated Apr. 15, 2013, U.S. Appl. No. 12/727,001, filed Mar. 18, 2010.
Non-Final Office Action, dated Nov. 6, 2013, U.S. Appl. No. 12/727,001, filed Mar. 18, 2010.
Non-Final Office Action, dated Mar. 20, 2014, U.S. Appl. No. 13/275,171, filed Oct. 17, 2011.
Final Office Action, dated Mar. 27, 2014, U.S. Appl. No. 12/727,001, filed Mar. 18, 2010.
Advisory Action, dated May 14, 2014, U.S. Appl. No. 12/727,001, filed Mar. 18, 2010.
Non-Final Office Action, dated Jun. 12, 2014, U.S. Appl. No. 12/727,001, dated Mar. 18, 2010.
Final Office Action, dated Aug. 27, 2014, U.S. Appl. No. 13/275,171, dated Oct. 17, 2011.
Final Office Action, dated Sep. 29, 2014, U.S. Appl. No. 12/727,001, dated Mar. 18, 2010.
Advisory Action, dated Oct. 29, 2014, U.S. Appl. No. 13/275,171, filed Oct. 17, 2011.
Non-Final Office Action, dated Feb. 5, 2015, U.S. Appl. No. 12/727,001, filed Mar. 18, 2010.
Non-Final Office Action, dated Feb. 13, 2015, U.S. Appl. No. 13/275,171, filed Oct. 17, 2011.
Final Office Action, dated Jul. 13, 2015, U.S. Appl. No. 13/275,171, dated Oct. 17, 2011.
Notice of Allowance, dated Jul. 16, 2015, U.S. Appl. No. 12/727,001, filed Mar. 18, 2010.
Non-Final Office Action, dated Nov. 19, 2015, U.S. Appl. No. 14/832,935, filed Aug. 21, 2015.
Notice of Allowance, dated Dec. 21, 2015, U.S. Appl. No. 13/275,171, filed Oct. 17, 2011.
Corrected Notice of Allowability, dated Jan. 19, 2016, U.S. Appl. No. 13/275,171, filed Oct. 17, 2011.
Final Office Action, dated Mar. 15, 2016, U.S. Appl. No. 14/832,935, filed Aug. 21, 2015.
Imielinski, T., et al., "GPS-Based Addressing and Routing," Network Working Group Request for Comments: 2009, Nov. 1996, 27 pages.

* cited by examiner

600

605: RECEIVE A DOMAIN NAME SYSTEM (DNS) QUERY ASSOCIATED WITH A CLIENT, THE DNS QUERY INCLUDING A DOMAIN NAME TO BE RESOLVED

610: ANALYZE THE DNS QUERY BASED ON PREDETERMINED CRITERIA

615: BASED ON THE ANALYSIS, SELECTIVELY REDIRECT A DATA REQUEST ASSOCIATED WITH THE CLIENT TO A PROXY SERVER FOR FURTHER MEDIATION

FIG. 6

INTERNET MEDIATION

CROSS-REFERENCE TO RELATED APPLICATIONS

The present application is a continuation-in-part of, and claims the priority benefit of, U.S. patent application Ser. No. 12/727,001 filed on Mar. 18, 2010, entitled "Internet Mediation," now U.S. Pat. No. 9,191,393 issued on Nov. 17, 2015, the disclosure of which is incorporated herein by reference in its entirety for all purposes.

FIELD

This disclosure relates generally to computer networks and, more specifically, to Internet mediation using a Domain Name System (DNS) server and a Hypertext Transfer Protocol (HTTP) proxy.

BACKGROUND

Internet users ("end users") can gain access to the Internet through a subscription service offered by an Internet Service Provider (ISP). End users who gain access to the Internet in this way may include individuals, members of families, and employees of businesses. The ISP may operate servers which may provide services to end users. Such services may include transporting email, resolving domain names, providing access to the World Wide Web ("the Web"), and others. The ISP's servers may be connected to one or more shared networks through which they can communicate with subscribers, other ISPs, and other types of entities.

A group of subscribing end users may access the Internet through user devices, which may include personal computers, tablets, smart phones, game boxes, and others. The user devices typically are connected to a subscriber network, which is normally a private network located on the subscriber premises, for example, in the subscriber's home or place of business. The subscriber network is connected through a gateway to a shared network, which may be interconnected to further shared networks. By this means a communication path may be established between each user device and the ISP's servers through the private network, the gateway, and one or more interconnected shared networks.

The subscriber may want to monitor and control (to exercise "device control") the Internet usage by individual user devices. The subscriber's reasons for wanting to exercise device control may include protecting users of user devices from malicious Web sites, exercising parental control over a child's Internet activities, and tracking user devices' patterns of usage. A business subscriber may have additional reasons for device control, such as blocking employee access to sites that are not work-related, and protecting company servers from damage or unauthorized access.

The ISP may also desire to exercise device control over individual user devices. The ISP's reasons for device control may include identifying a user device that is violating the ISP's terms of service, for example by conducting a denial of service attack, and collecting more detailed information about the subscriber's patterns of usage than would be possible without distinguishing the activities of individual user devices.

The Internet industry has developed several device control technologies, each of which has certain disadvantages. One type of device control employs device control software that runs on each user device. This technology complicates the task of installing and configuring device control software by distributing it over many devices of different types. The ISP must provide, and the subscriber must install, a different implementation of device control software for each type of device. Because the user devices are under direct control of users, they are highly exposed to tampering by users who want to compromise device control. If a user attaches a device without device control software to the subscriber network, the user can evade device control completely.

Another type of device control employs a subscriber firewall to manage traffic passing through the subscriber's gateway. A subscriber firewall is an effective means of limiting user devices to approved types of Internet operations, for example by forbidding the use of certain communication protocols and communication with certain IP addresses, but it requires a large amount of processing power because it must analyze and process every message that passes between a user device and the ISP. Being located physically on the subscriber's premises at electronically near the user devices, it is susceptible to defeat by users.

It may be possible to control Internet usage through a Domain Name Service (DNS) server. A user device may initiate a session by sending a DNS query to find out a network name of an Internet service associated with a domain name. The DNS server can return an answer that includes an IP address of the Internet service that is represented by the domain name. The DNS server may exercise device control by returning a different IP address, or an error response, or no response at all, according to policies defined by the ISP or the subscriber or both. Device control by a DNS server is efficient, since it operates on DNS queries, which are smaller and less numerous than the messages that a firewall must process, and it is more secure than a subscriber firewall, because it is located away from the subscriber's premises and behind the ISP's firewall, but the type of control it can exercise is limited because the information available to it is limited as well. For example, the DNS server cannot distinguish among different pathnames because a DNS query contains only a domain name, not a full pathname. It also cannot operate on the content of a request to or a response from an Internet service because the DNS server never receives such requests and responses, but only DNS queries.

SUMMARY

This summary introduces the present disclosure in a simplified form that is further described in the Detailed Description below. This summary is not intended to identify essential features of the present disclosure, nor is it intended for use as an aid in determining the scope of the claimed subject matter.

In some example embodiments, a method for mediating Internet service includes receiving a Domain Name System (DNS) query associated with a client, the DNS query including a domain name to be resolved, analyzing the DNS query based on predetermined criteria, and, based on the analysis, selectively redirecting a data request associated with the client to a proxy server for further mediation. The method can further include applying at least one DNS policy to the DNS query. The at least one DNS policy can be selected by a DNS policy engine associated with the DNS server. The applying the DNS policy can include one of the following actions: tracking client behavior, triggering an analytic action, limiting a rate of the data traffic, returning to the client a response to the DNS query the response including an error indication, and returning no response to the client.

In some example embodiments, the DNS policy is selected at least in part according to at least one of the following: a subscriber associated with the client, a domain name included in the DNS query, a DNS answer, an Extension Mechanisms for DNS (eDNS0) pseudo-resource record included in the DNS query, and a time of the DNS query. The DNS policy can also be selected based on one or more of the following: an IP address of a responding authoritative server, content of a resource record of the DNS answer, a result of the DNS query, a size of the DNS answer, and a type associated with the DNS query. The eDNS0 pseudo-resource record included in the DNS query can include a subnet address, the subnet address determining an identity of the client making the DNS request, and the DNS policy being selected at least in part according to the identity of the client.

In some example embodiments, the proxy server is configured to apply at least one proxy policy to the data request. The DNS policy and the proxy policy can be parts of the same policy entity. The at least one proxy policy can be selected by a proxy policy engine associated with the proxy server. The at least one proxy policy can be selected based at least in part on the following: a subscriber associated with the client, a URL included in the data request, the domain name received over Hypertext Transfer Protocol (HTTP) or Transport Layer Security (TLS) protocol, a time of the data request, and a time of the DNS query associated with the client.

In some example embodiments, applying the proxy policy includes one or more of the following actions: tracking client behavior, triggering an analytic action, adding one or more fields included in a header and trailer of the data request, modifying one or more fields included in a header and trailer of the data request, replacing one or more fields included in a header and trailer of the data request, removing one or more fields included in a header and trailer of the data request, modifying a payload included in the data request, replacing the payload included in the data request, forwarding the data request to a destination Internet Protocol (IP) address, returning a block page to the client, creating a data response to the data request and returning it to the client, returning an error response to the client, and returning no response to the client.

In some example embodiments, applying the proxy policy further includes one or more of the following actions: adding one or more fields included in a header and trailer of the data response, modifying one or more fields included in a header and trailer of the data response, replacing one or more fields included in a header and trailer of the data response, removing one or more fields included in a header and trailer of the data response, modifying a payload included in the data response, replacing the payload included in the data response, returning the data response to the client, returning a block page to the client, returning a different data response to the client, returning to the client a data response that causes the client to make additional requests to the proxy server, returning an error response to the client, and returning no response to the client.

In some example embodiments, the method for mediating Internet service further includes redirecting the data request based on a determination that the URL path refers to undesired content. The undesired content can include malware. The proxy server can redirect the data request to a different IP address than the one included in the data request received from the client.

In some other example embodiments, a system for mediating Internet service includes a DNS server and a DNS policy engine associated with the DNS server. The DNS policy engine can be configured to apply one or more DNS policies selected by the DNS policy engine to DNS queries received by the DNS server from a client, analyze the DNS query based on predetermined criteria, and based on the analysis, and selectively redirect a data request associated with the client to a proxy server for further mediation. The system can further include a proxy server and a proxy policy engine associated with the proxy server. The proxy policy engine can be configured to apply one or more proxy policies selected by the proxy policy engine to at least one of data requests received by the proxy server from a client and data responses returned to the proxy server from an IP address.

In some other example embodiments, applying a DNS policy includes one or more of: triggering an analytic action, limiting a rate of the data traffic, returning to the client a response to the DNS query, returning to the client a response to the DNS query, the response including an error indication, and returning no response to the client. The applying a proxy policy can include at least one of the following: triggering an analytic action, tracking client behavior, adding one or more fields included in a header and trailer of the data request, modifying one or more fields included in a header and trailer of the data request, replacing one or more fields included in a header and trailer of the data request, removing one or more fields included in a header and trailer of the data request, modifying a payload included in the data request; replacing the payload included in the data request, forwarding the data request to a destination IP address, returning a block page to the client, creating a data response to the data request and returning it to the client, returning a block page to the client, returning an error response to the client, and returning no response to the client.

In yet further example embodiments, a non-transitory processor-readable medium having instructions stored thereon, which when executed by one or more processors, cause the one or more processors to implement a method for mediation of Internet service is provided. The method can include receiving a Domain Name System (DNS) query associated with a client, the DNS query including a domain name to be resolved, analyzing the DNS query based on predetermined criteria, and, based on the analysis, selectively redirecting a data request associated with the client to a proxy server for further mediation.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example, and not by limitation, in the figures of the accompanying drawings, in which like references indicate similar elements.

FIG. 6 is a flow chart of a method for mediating Internet operations.

DETAILED DESCRIPTION

Figure 1:
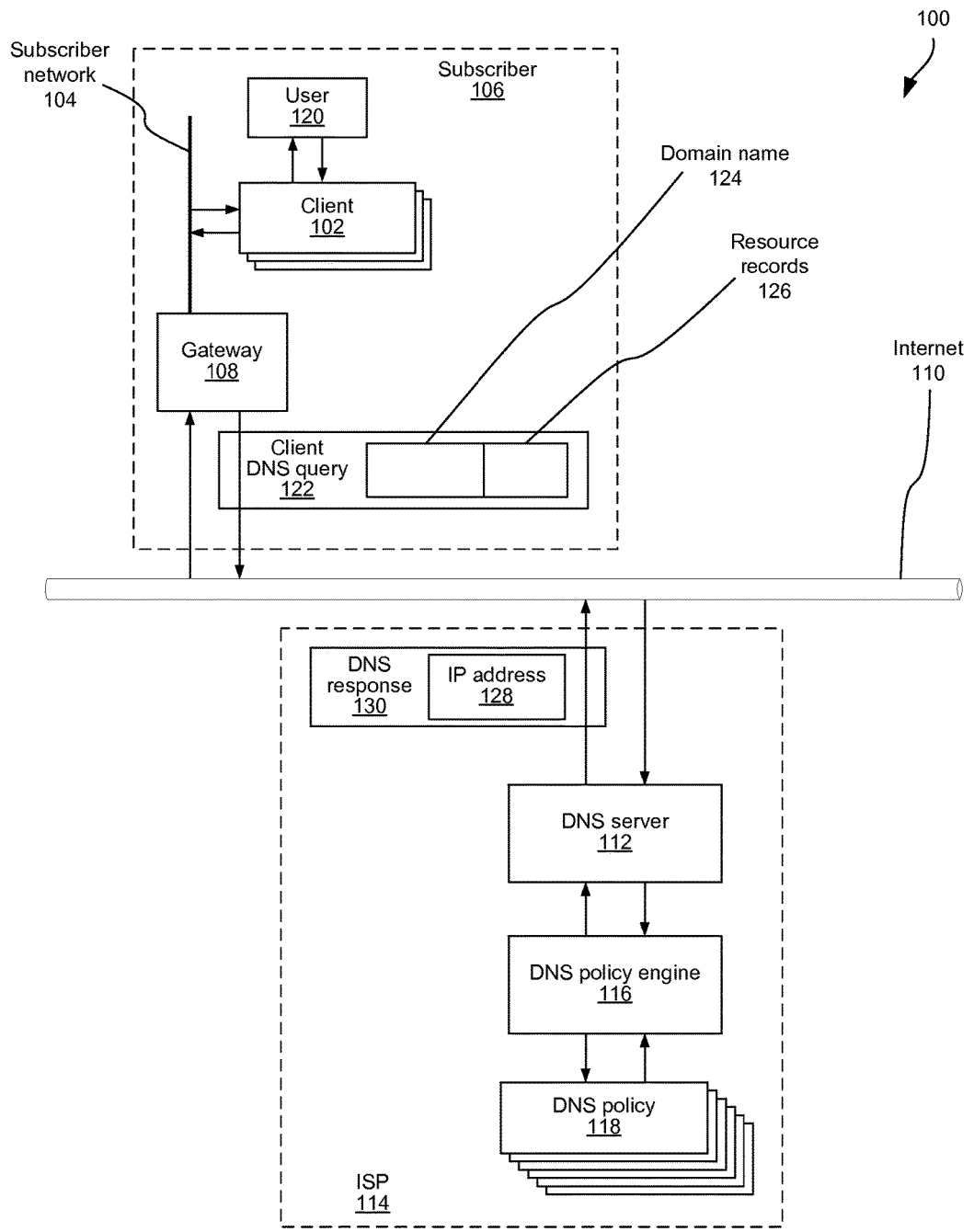
FIG. 1 is a block diagram illustrating a system for mediating Internet operations, showing components associated with issuing and responding a DNS query.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The present disclosure describes methods and systems for mediating Internet operations. A request for Internet service, such as a request for content from a Web service, can be fulfilled in two stages. In the first stage, an end user can enter a request on a user device, which causes the user device to submit a Domain Name Service (DNS) query to a Domain Name server which can be operated by the ISP. The DNS query can include a domain name which can be resolved to a server, such as a Web site, in a form that is easy for end users to remember and use. The DNS recursive server can resolve the domain name by locating a corresponding network address in a DNS cache or table which it maintains, or by obtaining the network address by querying one or more authoritative DNS servers. If the DNS server successfully finds a network address for the domain name, the DNS server can return the network address to the user device in a DNS response.

In the second stage of the request for Internet service, the user device can send a service request to a server at the network address (e.g., IP address) returned in the DNS response. A successful response to the service request may contain at least part of whatever text, image, or other content the end user entered the request to receive.

In some example embodiments of a system that operates according to the present disclosure, a DNS server operates in conjunction with a DNS policy engine to apply DNS policies defined by one or more of the subscriber, the ISP, and others. When the DNS server receives a DNS query from a user device, the DNS policy engine may select one or more DNS policies, and the DNS server applies the selected DNS policies to the DNS query. The DNS policies may at least in part determine the DNS server's disposition of the DNS query.

The DNS policy engine's DNS policies may determine the DNS server's disposition of DNS queries according to one or more of the domain name included in the DNS query, the identity of the user device that originated the query, other data in the DNS query, the time when the DNS query is made, and other information designated by the definers of the DNS policies.

The DNS policies selected by the DNS policy engine may further apply to the DNS response instead of or in addition to the DNS query. For example, a DNS policy may direct the DNS server to map the response's original IP address to a different IP address which is then returned to the user device. DNS policies that apply to the DNS response may determine the DNS server's disposition of the response according to any of the data that they may use to determine the DNS server's disposition of a DNS query, and further, according to any of the data in the DNS response, including but not limited to the IP address.

The DNS server's disposition of a DNS query according to DNS policies may include returning to the user device the IP address from the definition of the domain name in the DNS query (the "defined IP address"), returning a different IP address, returning a "domain name not found" error response, returning another type of error response, or returning no response.

In a case where the DNS server does not have sufficient information to exercise the desired type of device control, the DNS server may return the IP address of a proxy server. The DNS server may preserve the defined IP address by including it in the DNS response in the form of an OPT pseudo-resource-record (pseudo-RR) according to the Internet standard RFC 6891.

The user device accordingly sends its data request to the proxy server using the IP address received from the DNS sever in a service request. The proxy server can operate in conjunction with a proxy policy engine. The proxy policy engine can select one or more proxy policies, and the proxy server applies the selected proxy policies to the data request. The proxy policies may at least in part determine the proxy server's disposition of the data request.

The proxy policy engine may be distinct from the DNS policy engine or may be the same policy engine. The set of proxy policies accessed by the proxy policy engine may be the same as the set of DNS policies accessed by the DNS policy engine, or may be independent, or the two sets of policies may overlap.

The proxy server's disposition of the data request according to the proxy policy selected by the proxy policy engine may include forwarding the data request to the defined IP address, sending the data request to a different IP address, fulfilling the data request itself, or discarding the data request. The proxy server's disposition of the data request may further include inserting, deleting, modifying, or replacing one or more parts of the data request. The proxy server's disposition of the data request may further include returning a data response to the data request to the user device, returning a modified version of the data response, returning a substituted data response, returning an error response, or returning no response.

The proxy policy may determine the proxy server's disposition of a data request and of the data response according to one or more of the URL included in the data request, the identity of the user device making the data request, other data included in the data request, the time when the data request is made, and other information specified by the proxy policy. The proxy policy may further determine the proxy server's disposition of the data response according to the content of the response.

The DNS policy engine and the proxy policy engine function in complementary ways. The DNS policy engine is an efficient means of applying policies that refer to information included in a DNS query and response. Factors that contribute to the DNS policy engine's efficiency include the compactness of typical DNS queries and DNS responses relative to typical data requests and data responses; the tendency of clients to send similar DNS queries repeatedly, enabling the DNS server to cache both its responses and the DNS policy engine's selected DNS policies; and the fact that if a DNS query's disposition involves returning an error response or no response to the user device, the need to process a data request at all is eliminated. Conversely, the proxy policy engine is a more expensive means of applying policies, but allows a degree of client control that the DNS policy engine cannot. For example, it can analyze a data request's entire URL instead of just a DNS query's domain name, and the entirety of a data response instead of just a DNS response's IP address. Furthermore, it can apply an action specified by a proxy policy to the entire data request or response.

In the following description, the following terms are used in the specified ways:

"Mediation" means fulfilling a request for information performs by a user device in a way that is different from the way that the request would be performed in the present disclosure's absence. For example, "mediation" may include loading information from a different source than the one specified in the request, adding, modifying, or deleting parts of the request or the response, responding with a block page, responding with an error indication, and failing to respond at all.

"Defined IP address" refers to the IP address that is or would be resolved from a domain name included in a DNS query by an unmediated DNS server.

An "initiating DNS query" is that DNS query, the response to which included the IP address which a subsequent data request uses as its destination IP address.

Referring now to the drawings, FIG. 1 illustrates processing a DNS query 100 according to one embodiment of the present disclosure. A plurality of clients 102 are communicably connected to a subscriber network 104 on the premises of a subscriber 106. The clients 102 may be user devices of various types such as personal computers, tablet computers, smartphones, and game boxes. The subscriber network 104 is communicably connected through a gateway 108 to the Internet 110.

A DNS server 112 operated by an ISP 114 is communicably connected to the Internet 110. A DNS policy engine 116 is communicably connected to the DNS server 106. The DNS policy engine 116 may have access to a plurality of DNS policies 118.

Internet activity is initiated when a user 120 enters a request for information to one of the clients 102. The client sends a DNS query 122 through the subscriber network 104, the gateway 108, and the Internet 110 to the ISP 114's DNS server 112. The DNS query 122 includes a domain name 124 which specifies the source of the information requested by the user 120, and may further include one or more resource records 126.

In an unmediated method or system the DNS server 112 would attempt to resolve the domain name 124 to an IP address 128. If the DNS server 112 resolved the domain name 124 it would send a DNS response 130 to the client 102, the DNS response 130 including the IP address 128. If the DNS server 112 failed to resolve the domain name 124 it would send a DNS response 130 to the client 102, the DNS response 130 including an error indication, such as "domain name not found" or "DNS server error."

In a method or system that operates according to an embodiment of the present disclosure, the DNS policy engine 116 analyzes the DNS query 122 according to predetermined criteria. The DNS policy engine 116 may obtain the predetermined criteria from a DNS policy 118 that applies to the DNS query 122, the DNS policy engine 116 selecting the DNS policy 118 according to criteria that may include the identity of the subscriber 106, the domain name 124 in the DNS query 112, one or more resource records 126 included in the DNS query 122, a time when the DNS query 112 was sent by the client 102, and a time when the DNS query 112 was received by the DNS server 112.

If the DNS policy engine 116 may select at least one DNS policy 118, the DNS server 112 may apply the DNS policy 118 to the DNS query 122 and respond to the DNS query 122 according to one or more actions specified by the DNS policy 118. Actions specified by the DNS policy 118 may include tracking client behavior, triggering an analytic action, limiting the rate of data traffic, returning a mediated DNS response 130 to the client 102, and returning no response to the client 102 (blocking the DNS query 122). If the DNS policy engine 116 does not select at least one DNS policy 118, the DNS server 112 may respond to the DNS query 122 as it would in an unmediated system, that is by attempting to resolve the domain name 124 to an ISP address 128 and returning to the client 102 an unmediated DNS response 130 which includes either the IP address 128 or an error indication.

Tracking client behavior may include recording information associated with the DNS request 122 or the DNS response 130, such information to be used to create a record of the Internet activity of the client 102.

Triggering an analytic action may include recording information associated with the DNS request 122 or the DNS response 130, such information to be used to create summary information about the Internet activity of the client 102.

Limiting the rate of data traffic may include restricting a DNS query 122 from a client 102 if the DNS server 112 has received more than a specified number of DNS queries 122 from the same client 102 that included the same domain name 124 within a specified period of time. Restricting a DNS query 122 may include returning a DNS response 130 that includes an error indication, returning a DNS response 130 that includes a domain name that displays a blocking page, and returning no DNS response.

Returning a mediated DNS response 130 to the client 102 means returning a DNS response that may be modified by application of the DNS policy 118 selected by the DNS policy engine 116. Modification may include one or more of the following: resolving the domain name 124 to an IP address 128 according to a procedure specified by the DNS policy 118 rather than the procedure used by an unmediated DNS server 112 or mapping the IP address 128 resolved from the domain 124 to a different IP address.

Figure 2:
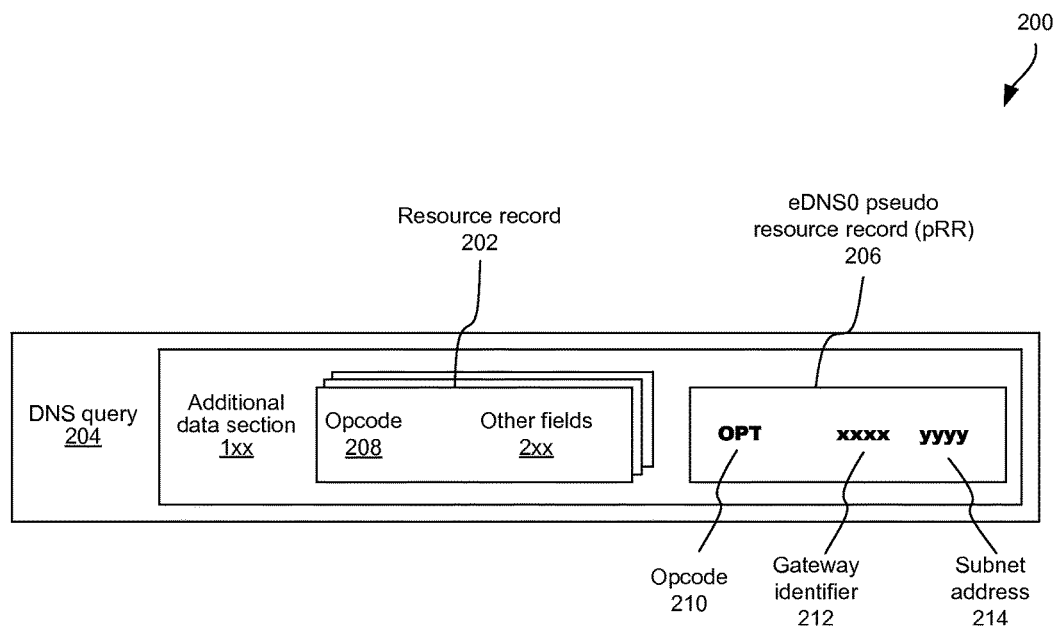
FIG. 2 is a block diagram illustrating parts of a DNS query.

Referring now to FIG. 2, which shows parts of a DNS query 200, the resource records 126, 202 in the DNS query 122, 204 which the DNS policy engine 116 may use to select a DNS policy 118 and include an eDNS0 pseudo-resource record (pRR) 206. Each resource record 202 has a type which is identified by an opcode 208. The opcode of an eDNS0 pRR 210 is OPT. The purpose of an eDNS0 pRR 206 is to convey any type of information not accommodated by a standard type of resource record 202 or by another field in the DNS query 122, 204.

In one embodiment of the present disclosure an eDNS0 pRR 206 includes a gateway identifier 212 and a subnet address 214. The gateway identifier 212 uniquely identifies the gateway 108 through which the subscriber network 104 is connected to the Internet 110. The subnet identifier 214 uniquely identifies the client 102 which issued the DNS query 122, 204. Thus the eDNS0 pRR 206 uniquely identifies the client 102 that issued the DNS query 122, 204, enabling the DNS policy engine 116 to select a DNS policy 116 that applies to that client 102, as distinguished from any other client 102 that is connected to the subscriber 106's subscriber network 104.

Figure 3:
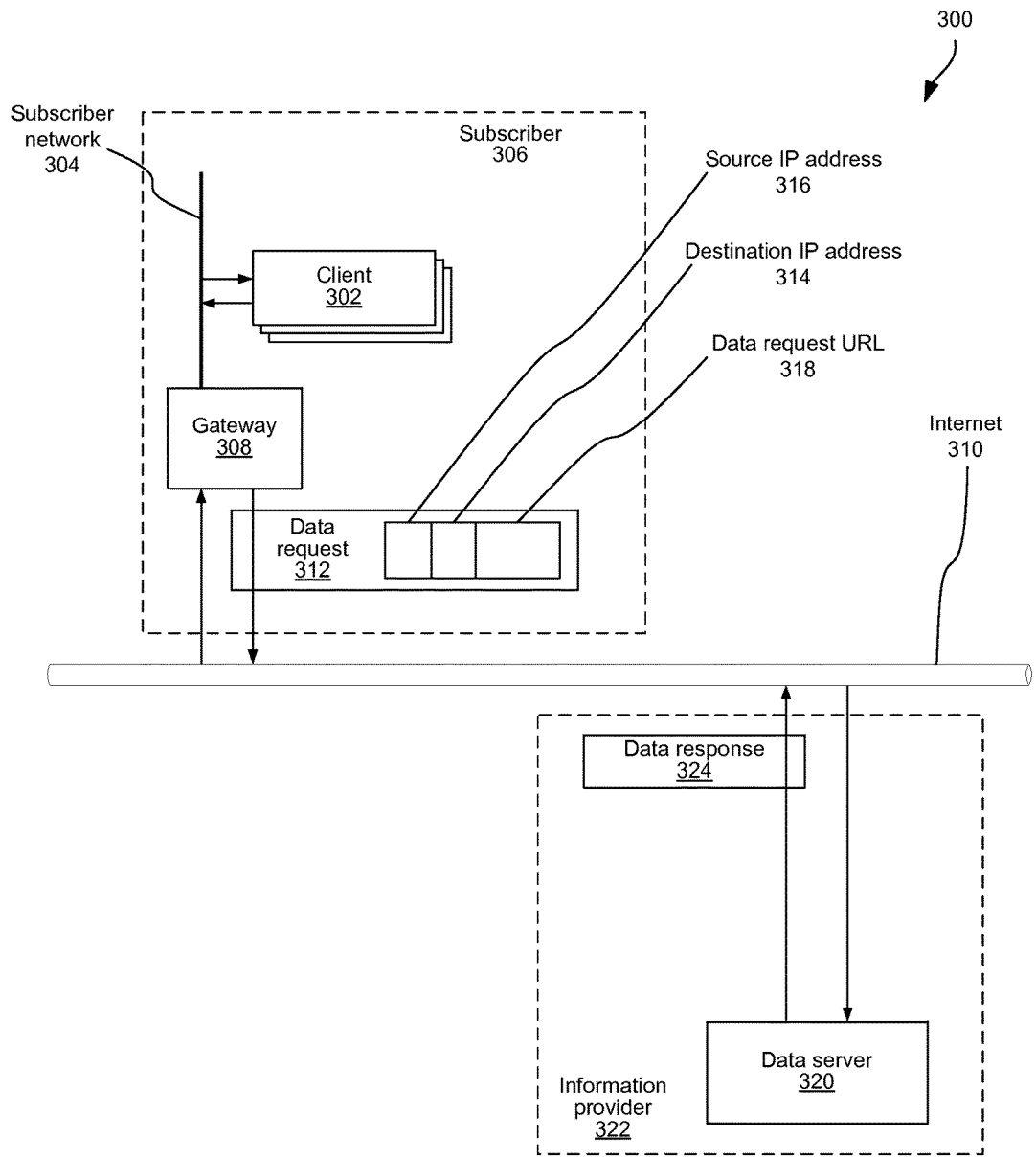
FIG. 3 is a block diagram illustrating a system for mediating Internet operations, showing components associated with issuing and responding to a data request.

FIG. 3 illustrates the processing of an unmediated data request 300, which is performed in Internet transactions that are not mediated, and also is performed in some Internet transactions that are mediated according to one embodiment of the present disclosure. It will be understood that the following elements in FIG. 3 can be identical or similar to corresponding elements of FIG. 1: the client 302 to 102; the subscriber network 304 to 104; the subscriber 306 to 106; the gateway 308 to 108; and the Internet 310 to 110.

The client 302 can send a data request 312 to a destination IP address 314, which is the IP address 128 that the DNS server 112 returned to the client 102, 302 in the DNS response 130. The data request 312 includes a source IP address 316, which refers to the client 302, the destination IP address 314, and a data request URL 318, which specifies information being requested by the client 302. The data request 312 passes through the subscriber network 304, the gateway 308, and the Internet 310 to a data server 320 operated by an information provider 322. The data server 320 returns a data response 324 to the client 302 at the source IP address 316 of the data request 312.

In a method or system that mediates Internet transactions according to an embodiment of the present disclosure, a data request 312 is handled according to the process illustrated in FIG. 3 if the actions of the one or more DNS policies 118 applied to the DNS query 122 do not include further mediation by a proxy server. If the actions of the one or more DNS policies 118 applied to the DNS query 122 include further mediation by a proxy server, the data request 312 is handled according to the process illustrated in FIG. 4, which illustrates the processing of a mediated data request 400.

Figure 4:
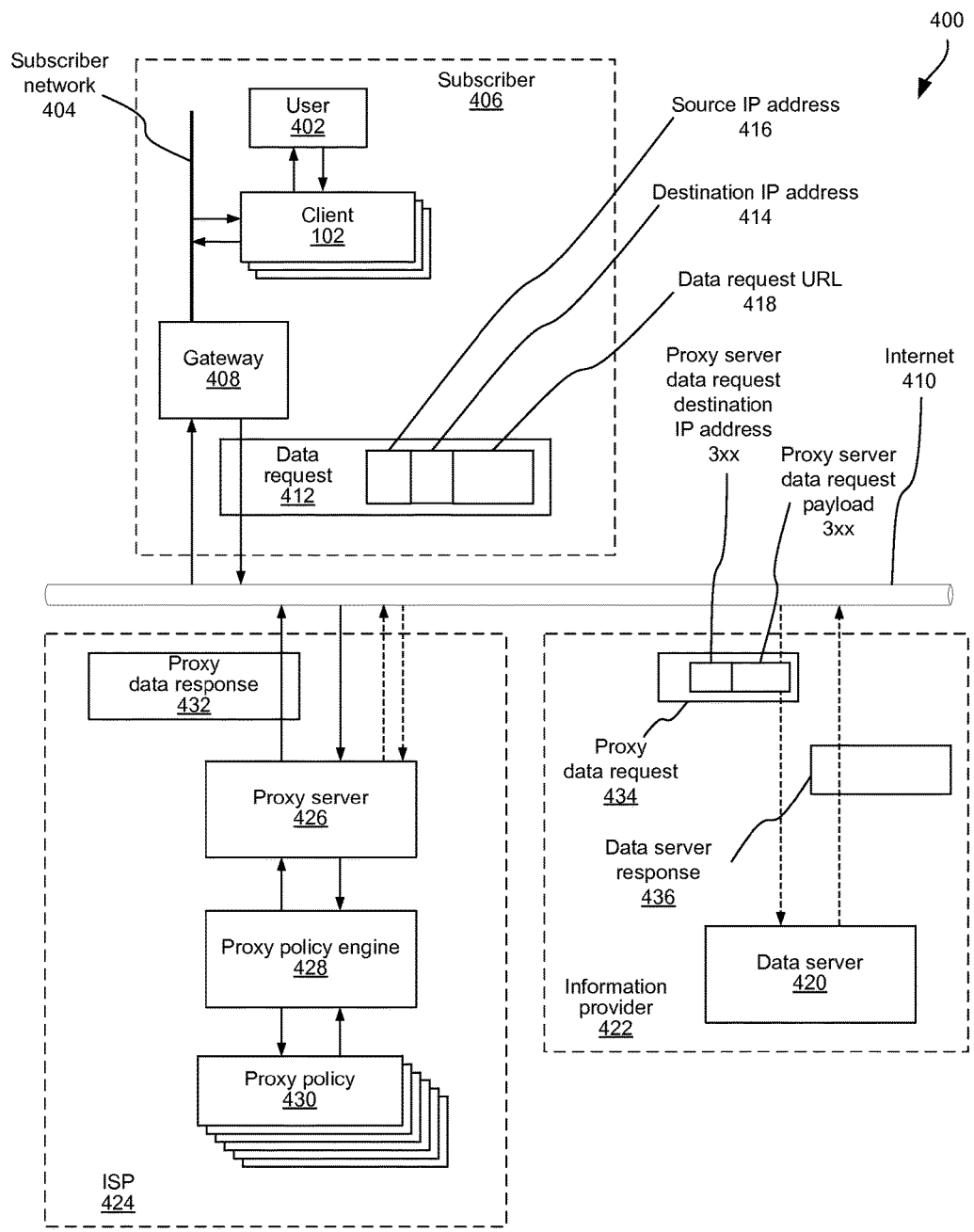
FIG. 4 is a block diagram illustrating a system for mediating Internet operations, showing components associated with issuing and responding to a data request that is redirected to a proxy server.

It will be understood that the following components in FIG. 4 can be identical or similar to the corresponding elements in FIG. 1 and FIG. 3: the client 402 to 102, 302; the subscriber network 404 to 104, 304; the subscriber 406 to 106, 306; the gateway 408 to 108, 308; the Internet 410 to 110, 310; the data request 412 to 312; the destination IP address 414 to 314; the source IP address 416 to 316; the data request URL 418 to 318; the data server 420 to 320; the information provider 422 to 322; and the ISP 424 to 114.

A proxy server 426 is communicably connected to the Internet 410. A proxy policy engine 428 is communicably connected to the proxy server 426. The proxy policy engine 429 may have access to a plurality of proxy policies 430.

The client 402 can send a data request 412 to a destination IP address 414, the destination IP address 414 being the IP address 128 that the DNS server 112 returned to the client 102, 402 in the DNS response 130. The data request 412 includes the source IP address 416, which refers to the client 402, the destination IP address 414, and the data request URL 418, which specifies information being requested by the client 402. Because the data request 412 is to be mediated, however, the destination IP address 414 refers to the proxy server 426 rather than to the data server 420.

The data request 412 passes through the subscriber network 404, the gateway 408, and the Internet 410 to the proxy server 426. The proxy policy engine 428 analyzes the data request 412 according to predetermined criteria. The proxy policy engine 428 may obtain the predetermined criteria from a proxy policy 430 that applies to the data request 412, the proxy policy engine 428 selecting the proxy policy 430 according to criteria that may include the identity of the subscriber 406, the data request URL 418, domain name 124 in the DNS query 112 which returned the destination IP address 414, a time when the data request 412 was sent by the client 402, a time when the data request 412 was received by the proxy server 424, and the time when the DNS query 112 was sent by the client 102, 402.

If the proxy policy engine 428 selects at least one proxy policy 430, the proxy server 426 may apply the proxy policy 430 to the data request 412 and respond to the data request 412 according to one or more actions specified by the proxy policy 430. Actions specified by the proxy policy 430 may include one or more of the following: tracking client behavior; triggering an analytic action; adding, modifying, replacing, or removing one or more fields included in a header and trailer of the data request 412; modifying or replacing a payload included in the data request 412; forwarding the data request 412 to the destination IP address 414; forwarding the data request to a different destination IP address; returning a block page to the client 402; creating a data response 432 to the data request 412 and returning it to the client 402; returning an error response to the client 402; and returning no response to the client 402.

If the actions specified by the proxy policy 430 applied to the data request 412 include forwarding the data request 412 to the data server 420, the proxy server 426 constructs a proxy data request 434. The proxy data request 434 includes a source IP address, which is set to the proxy server 424's own IP address, and a destination IP address, which is set to the IP address 128 which the DNS server 112 obtained by resolving domain name 124. The proxy data request 434 further includes header and trailer fields and a payload, all constructed according to the selected proxy policy 430.

The data server 420 can process the proxy data request 434 and sends a data server response 436. The data server response 436 goes to the proxy server according to the proxy data request 434's source IP address, which becomes the data server response 436's destination IP address. The proxy server 426 may perform further actions on the proxy data server response 436 as specified by the selected proxy policy 428. The further actions may include: adding, modifying, replacing, or removing one or more fields included in the data server response 436's header and trailer; modifying or replacing the data server response 436's payload; returning the data server response 436 to the client 402; returning a block page to the client 402; returning a different data response to the client 402; returning to the client 402 a proxy data response 432 that causes the client 402 to make additional requests to the proxy server 426; returning an error response to the client 402; and returning no response to the client 402.

If the selected proxy policy 430 specifies that the data request 412 be redirected to a further data server other than the data server 420, a proxy data request 432 is constructed and sent to the further data server, and the further data server's data server response 436 is returned to the proxy server 426, in the same manner as is described for the data server 420.

In accord with the selected proxy policy 430, the proxy server 426 may redirect the data request 412 to a further data server on the basis of any type of determination about the content of the data request 412, such as a determination that the data request URL 418 refers to malware or to another type of undesired content.

The selected proxy policy 430 may be the same entity as the selected DNS policy 118 which the DNS server 112 applied to the initiating DNS query. The proxy policy engine 428 and the DNS policy engine 116 may have access to a single collection of entities, some of the entities being proxy policies 430, some being DNS policies 118, and some being both.

Figure 5:
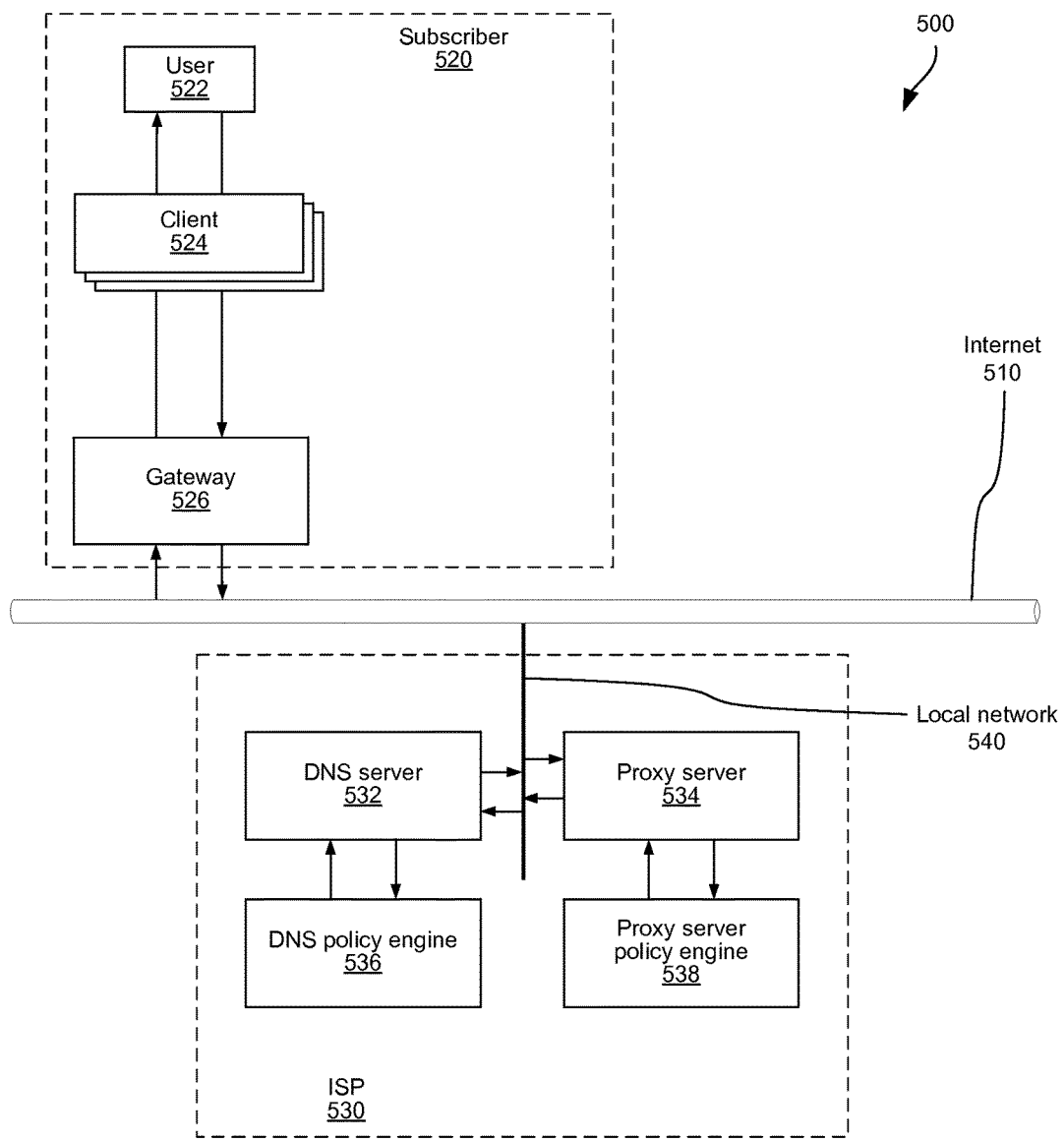
FIG. 5 is a block diagram illustrating a system for mediating Internet operations.

FIG. 5 shows the components of a system 500 which can implement embodiment of the present disclosure. Under control of an ISP 530, a DNS server 532 and a proxy server 532 are each communicably connected to a local network 540. The local network 540 is communicably connected to the Internet 510. A DNS policy engine 536 is communicably connected to the DNS server 532, and a proxy policy engine 538 is communicably connected to the proxy server 534.

On the premises of a subscriber 520, a user 522 operates one of a plurality of clients 524, the clients 524 being any of a variety of computing devices such as personal computers, tables, smartphones, and game boxes. The clients 524 are communicably connected to a subscriber network. A gateway 526 communicably connects the subscriber network to the Internet 510.

When the user 522 initiates an Internet transaction, the client 524 sends a DNS query through the subscriber network, the gateway 526, the Internet 510, and the local network 540 to the DNS server 532. The DNS policy engine 536 may supply a predefined DNS policy to the DNS server 532, and the DNS server 532 applies the DNS policy to the DNS query. The DNS server 532 responds to the DNS query according to one or more actions specified by the DNS policy. The actions specified by the DNS policy may include one or more of the following: tracking client behavior, triggering an analytic action, limiting the rate of data traffic, returning a mediated DNS response to the client 524, and returning no response to the client 524 (blocking the DNS query). If the DNS policy engine 536 does not supply at least one DNS policy, the DNS server 532 may respond to the DNS query as it would in an unmediated system, that is by attempting to resolve a domain name included in the DNS query to an ISP address and returning to the client 524 an unmediated DNS response which includes either the IP address or an error indication.

If the DNS response is mediated by a DNS policy, the DNS response may include the IP address of the proxy server 534 instead of the IP address that corresponds to the domain name in the DNS query (the defined IP address). In that case the client 524 sends a following data request to the proxy server rather than to a data server at the defined IP address. The proxy policy engine 538 may supply a predefined proxy policy to the proxy server 534, and the proxy server 534 applies the proxy policy to the data request. The proxy server 534 responds to the data request according to one or more actions specified by the proxy policy. The actions specified by the proxy policy may include one or more of the following: tracking client behavior; triggering an analytic action; adding, modifying, replacing, or removing one or more fields included in a header and trailer of the data request; modifying or replacing a payload included in the data request; forwarding the data request to the data server at the defined IP address; forwarding the data request to a further data server at a different IP address; returning a block page to the client 522; creating a data response to the data request and returning it to the client 522; returning an error response to the client 522; and returning no response to the client 522.

If the actions specified by the proxy policy include forwarding the data request to the data server at the defined IP address or to a further data server at a different IP address, the proxy server 534 constructs a proxy data request according to the actions specified by the proxy policy. The proxy data request includes a source IP address which refers to the proxy server 534 itself and a destination IP address which refers to respectively to the data server or the further data server. The proxy data request is accordingly sent to the data server or the further data server, which processes the proxy data request and returns a data server response to the proxy server 534. The proxy data server 534 may perform further actions upon the data server response according to the proxy policy. Such actions may include: adding, modifying, replacing, or removing one or more fields included in the data server response's header and trailer; modifying or replacing the data server response's payload; returning the data server response to the client 524; returning a block page to the client 524; returning a different data response to the client 524; returning to the client 524 a proxy data response that causes the client 524 to make additional requests to the proxy server 524; returning an error response to the client 524; and returning no response to the client 524.

Many modifications and other embodiments of the example descriptions set forth herein to which these descriptions pertain will come to mind of those having the benefit of the teachings presented in the foregoing descriptions and the associated drawings. Thus, it will be appreciated that the disclosure may be embodied in many forms and should not be limited to the example embodiments described above.

Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for the purposes of limitation.

FIG. 6 is flow chart illustrating a method 600 for mediating the Internet, according to some example embodiments. The method 600 may be performed by processing logic that may comprise hardware (e.g., decision-making logic, dedicated logic, programmable logic, and microcode), software (such as software run on a general-purpose computer system or a dedicated machine), or a combination of both. In one example embodiment, the processing logic refers to one or more components of the system 500 described above with reference to FIG. 5. Notably, the steps recited below may be implemented in an order different than described and shown in the figure. Moreover, the method 600 may have additional steps not shown herein, but which can be evident for those skilled in the art from the present disclosure. The method 600 may also have fewer steps than outlined below and shown in FIG. 6.

The method for mediating Internet 600 may commence at operation 605 with receiving a Domain Name System (DNS) query associated with a client. The DNS query can include a domain name to be resolved.

At operation 610, the DNS query can be analyzed based on predetermined criteria. The method 600 can further include applying at least one DNS policy to the DNS query. The at least one DNS policy can be selected by a DNS policy engine associated with the DNS server. Applying the DNS policy can include one of the following actions: tracking client behavior, triggering an analytic action, limiting a rate of the data traffic, returning to the client a response to the DNS query the response including an error indication, and returning no response to the client.

In some example embodiments, the DNS policy is selected at least in part according to at least one of the following: a subscriber associated with the client, a domain name included in the DNS query, a DNS answer, an Extension Mechanisms for DNS (eDNS0) pseudo-resource record included in the DNS query, and a time of the DNS query. The eDNS0 pseudo-resource record included in the DNS query can include a subnet address, the subnet address determining an identity of the client making the DNS request, and the DNS policy being selected at least in part according to the identity of the client.

At operation 615, a data request associated with the client to a proxy server can be selectively redirected for further mediation. The proxy server can be configured to apply at least one proxy policy to the data request. The DNS policy and the proxy policy can be parts of the same policy entity. The at least one proxy policy can be selected by a proxy policy engine associated with the proxy server. The at least one proxy policy can be selected based at least in part on the following: a subscriber associated with the client, a URL included in the data request, the domain name received over HTTP, a time of the data request, and a time of the DNS query associated with the client.

In some example embodiments, applying the proxy policy includes one or more of the following actions: tracking client behavior, triggering an analytic action, adding one or more fields included in a header and trailer of the data request, modifying one or more fields included in a header and trailer of the data request, replacing one or more fields included in a header and trailer of the data request, removing one or more fields included in a header and trailer of the data request, modifying a payload included in the data request, replacing the payload included in the data request, forwarding the data request to a destination Internet Protocol (IP) address, returning a block page to the client, creating a data response to the data request and returning it to the client, returning an error response to the client, and returning no response to the client.

In some example embodiments, applying the proxy policy further includes one or more of the following actions: adding one or more fields included in a header and trailer of the data response, modifying one or more fields included in a header and trailer of the data response, replacing one or more fields included in a header and trailer of the data response, removing one or more fields included in a header and trailer of the data response, modifying a payload included in the data response, replacing the payload included in the data response, returning the data response to the client, returning a block page to the client, returning a different data response to the client, returning to the client a data response that causes the client to make additional requests to the proxy server, returning an error response to the client, and returning no response to the client.

Figure 7:
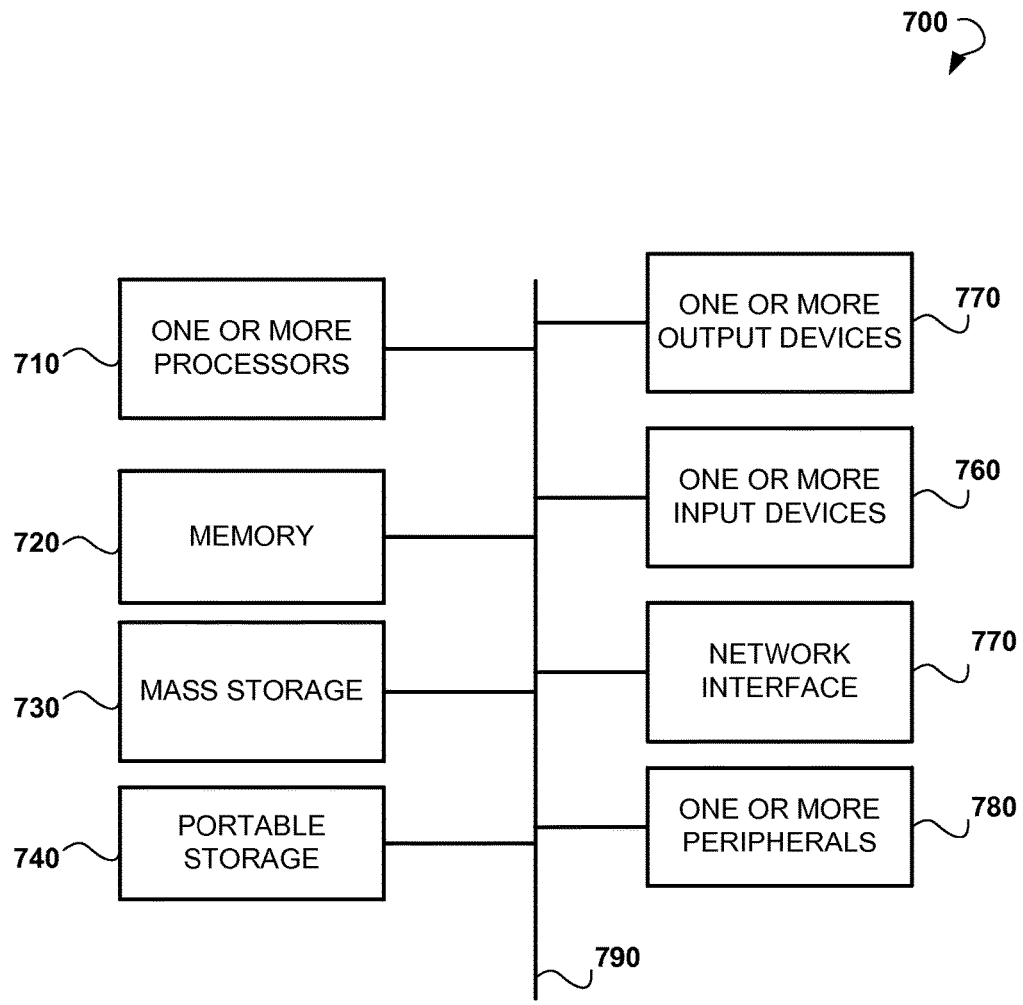
FIG. 7 is a computer system that can be used to implement the methods for mediating Internet operations.

FIG. 7 illustrates an exemplary computing system 700 that may be used to implement embodiments described herein. System 700 of may be implemented in the contexts of the likes of client device 105, the recursive DNS server 110, and the agent 120. The computing system 700 of FIG. 7 may include one or more processors 710 and memory 720. Memory 720 stores, in part, instructions and data for execution by processor 710. Memory 700 can store the executable code when the system 700 is in operation. The system 700 of FIG. 7 may further include a mass storage device 730, portable storage medium drive(s) 740, one or more output devices 750, one or more input devices 760, a network interface 770, and one or more peripheral devices 780.

The components shown in FIG. 7 are depicted as being connected via a single bus 790. The components may be connected through one or more data transport means. Processor 510 and memory 520 may be connected via a local microprocessor bus, and the mass storage device 530, peripheral device(s) 580, portable storage device 540, and network interface 570 may be connected via one or more input/output (I/O) buses.

Mass storage device 530, which may be implemented with a magnetic disk drive or an optical disk drive, is a non-volatile storage device for storing data and instructions for use by a magnetic disk or an optical disk drive, which in turn may be used by processor 510. Mass storage device 530 can store the system software for implementing embodiments described herein for purposes of loading that software into memory 520.

Portable storage medium drive(s) 540 operates in conjunction with a portable non-volatile storage medium, such as a compact disk (CD) or digital video disc (DVD), to input and output data and code to and from the computer system 500 of FIG. 5. The system software for implementing embodiments described herein may be stored on such a portable medium and input to the computer system 500 via the portable storage medium drive(s) 540.

Input devices 560 provide a portion of a user interface. Input devices 560 may include an alphanumeric keypad, such as a keyboard, for inputting alphanumeric and other information, or a pointing device, such as a mouse, a trackball, a stylus, or cursor direction keys. Additionally, the system 500 as shown in FIG. 5 includes output devices 550. Suitable output devices include speakers, printers, network interfaces, and monitors.

Network interface 570 can be utilized to communicate with external devices, external computing devices, servers, and networked systems via one or more communications networks such as one or more wired, wireless, or optical networks including, for example, the Internet, intranet, local area network (LAN), wide area network (WAN), cellular phone networks (e.g. Global System for Mobile (GSM) communications network, packet switching communications network, circuit switching communications network), Bluetooth radio, and an IEEE 802.11-based radio frequency network, among others. Network interface 570 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a Universal Serial Bus (USB).

Peripherals 580 may include any type of computer support device to add additional functionality to the computer system. Peripheral device(s) 380 may include a modem or a router.

The components contained in the computer system 500 of FIG. 5 are those typically found in computer systems that may be suitable for use with embodiments described herein and are intended to represent a broad category of such computer components that are well known in the art. Thus, the computer system 500 of FIG. 5 can be a personal computer (PC), hand held computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a Central Processing Unit (CPU) for execution. Such media can take many forms, including, but not limited to, non-volatile media, volatile media, and transmission media. Non-volatile media include, for example, optical or magnetic disks, such as a fixed disk. Volatile media include dynamic memory, such as system random access memory (RAM). Transmission media include coaxial cables, copper wire, and fiber optics, among others, including the wires that include one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, methods and systems for Internet mediation have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense. There are many alternative ways of implementing the present technology. The disclosed examples are illustrative and not restrictive.

What is claimed is:

1. A method for mediating Internet service, the method comprising:
A. at a DNS server:
receiving a Domain Name System (DNS) query associated with a client, the DNS query including a domain name to be resolved;
analyzing the DNS query based on predetermined criteria;
receiving a selection of a DNS policy from a policy engine;
applying the DNS policy to the DNS query;
based on the application of the DNS policy, redirecting a valid data request associated with the client to a proxy server for further mediation, said redirecting comprising:
responding to the DNS query with an IP address of the proxy server rather than with a defined IP address for the domain name;
B. at the proxy server:
receiving the valid data request from the client as a result of said redirection;
receiving a selection of proxy policy from a policy engine;
applying the proxy policy to the valid data request;
based on application of the proxy policy, performing any of:
(i) loading information from a different source than the one specified in the valid data request, and providing said information to the client in response to the valid data request, and
(ii) constructing a proxy data request in response to the valid data request, sending the proxy data request to an IP address corresponding to the domain name, receiving a data response to the proxy data request, and applying the proxy policy;
C. at the policy engine:
communicating with the DNS server to select the DNS policy to apply, wherein said selection of the DNS policy comprises selecting a policy entity from a collection of policy entities, the DNS policy and the proxy policy each being part of the selected policy entity;
communicating with the proxy server to select the proxy policy to apply, wherein said selection of the proxy policy comprises selecting the policy entity from the collection of policy entities, the DNS policy and the proxy policy each being part of the selected policy entity.

2. The method of claim 1, wherein applying the DNS policy includes one of the following actions:
tracking client behavior;
triggering an analytic action;
limiting a rate of the data traffic;
returning to the client a response to the DNS query, the response including an IP address of the proxy server;
returning to the client a response to the DNS query, the response including an error indication; and
returning no response to the client.

3. The method of claim 1, wherein the DNS policy is selected based at least on one of the following:
a subscriber associated with the client;
a domain name included in the DNS query;
a DNS answer;
an Extension Mechanisms for DNS (eDNS0) pseudo-resource record included in the DNS query; and
a time of the DNS query.

4. The method of claim 3, wherein the eDNS0 pseudo-resource record included in the DNS query includes a subnet address, the subnet address determining an identity of the client making the DNS request, the DNS policy being selected at least in part according to the identity of the client.

5. The method of claim 1, wherein the DNS policy is selected based on one or more of the following: an IP address of a responding authoritative server, content of a resource record associated with the DNS answer, a result of the DNS query, a size of the DNS answer, and a type associated with DNS query.

6. The method of claim 1, wherein the proxy policy is selected based at least in part on one or more of the following:
   a subscriber associated with the client;
   a URL included in the valid data request;
   the domain name received over HTTP or TLS protocol;
   a time of the valid data request; and
   a device type determined based on an inspection of the User-Agent header.

7. The method of claim 1, wherein applying the proxy policy includes one or more of the following actions:
   tracking client behavior;
   triggering an analytic action;
   adding one or more fields included in a header and trailer of the valid data request;
   modifying one or more fields included in a header and trailer of the valid data request;
   replacing one or more fields included in a header and trailer of the valid data request;
   removing one or more fields included in a header and trailer of the valid data request;
   modifying a payload included in the valid data request;
   replacing the payload included in the valid data request;
   forwarding the valid data request to a destination Internet Protocol (IP) address;
   returning a block page to the client;
   creating a data response to the valid data request and returning it to the client;
   returning an error response to the client; and
   returning no response to the client.

8. The method of claim 1, wherein applying the proxy policy further includes one or more of the following actions:
   adding one or more fields included in a header and trailer of the data response;
   modifying one or more fields included in a header and trailer of the data response;
   replacing one or more fields included in a header and trailer of the data response;
   removing one or more fields included in a header and trailer of the data response;
   modifying a payload included in the data response;
   replacing the payload included in the data response;
   returning the data response to the client;
   returning a block page to the client;
   returning a different data response to the client;
   returning to the client a data response that causes the client to make additional requests to the proxy server;
   returning an error response to the client; and
   returning no response to the client.

9. The method of claim 8, comprising (i) loading information from a different source than the one specified in the valid data request, which comprises redirecting the valid data request based on a determination that a URL path in the valid data request refers to undesired content.

10. The method of claim 9, wherein the undesired content includes malware.

11. The method of claim 1, comprising (i) loading information from a different source than the one specified in the valid data request, which comprises the proxy server redirecting the valid data request.

12. A system for mediating Internet service, the system comprising:

A. a DNS server comprising at least one hardware processor and memory storing computer program instructions executed on the at least one hardware processor to cause the DNS server to:
   receive a Domain Name System (DNS) query associated with a client, the DNS query including a domain name to be resolved;
   analyze the DNS query based on predetermined criteria;
   receive a selection of a DNS policy from a policy engine; apply the DNS policy to the DNS query;
   based on the application of the DNS policy, redirecting a valid data request associated with the client to a proxy server for further mediation, said redirection comprising:
      responding to the DNS query with an IP address of the proxy server rather than with a defined IP address for the domain name;

B. the proxy server comprising at least one hardware processor and memory storing computer program instructions executed on the at least one hardware processor to cause the proxy server to:
   receive the valid data request from the client as a result of said redirection;
   receive a selection of proxy policy from a policy engine;
   apply the proxy policy to the valid data request;
   based on application of the proxy policy, perform any of:
      (i) loading information from a different source than the one specified in the valid data request, and providing said information to the client in response to the valid data request, and
      (ii) constructing a proxy data request in response to the valid data request, sending the proxy data request to an IP address corresponding to the domain name, receiving a data response to the proxy data request, and applying the proxy policy to the data response;

C. the policy engine comprising at least one hardware processor and memory storing computer program instructions executed on the at least one hardware processor to cause the policy engine to:
   communicate with the DNS server to select the DNS policy to apply, wherein said selection of the DNS policy comprises selecting a policy entity from a collection of policy entities, the DNS policy and the proxy policy each being part of the selected policy entity;
   communicate with the proxy server to select the proxy policy to apply, wherein said selection of the proxy policy comprises selecting the policy entity from the collection of policy entities, the DNS policy and the proxy policy each being part of the selected policy entity.

13. The system of claim 12, wherein the applying the DNS policy includes one or more of:
   triggering an analytic action;
   limiting a rate of the data traffic;
   returning to the client a response to the DNS query, the response including an IP address of the proxy server;
   returning to the client a response to the DNS query, the response including an error indication; and
   returning no response to the client.

14. The system of claim 12, wherein applying the proxy policy includes at least one of the following:
   triggering an analytic action;

tracking client behavior;
adding one or more fields included in a header and trailer of the valid data request;
modifying one or more fields included in a header and trailer of the valid data request;
replacing one or more fields included in a header and trailer of the valid data request;
removing one or more fields included in a header and trailer of the valid data request;
modifying a payload included in the valid data request;
replacing the payload included in the valid data request;
forwarding the valid data request to a destination IP address;
returning a block page to the client;
creating a data response to the valid data request and returning it to the client;
returning an error response to the client;
returning no response to the client;
modifying a payload included in a data response;
replacing the payload included in the data response;
returning the data response to the client;
returning a different data response to the client;
returning to the client a data response that causes the client to make additional requests to the proxy server; and
returning no response to the client.

15. One or more non-transitory computer-readable storage mediums having embodied thereon one or more programs, the one or more programs executed by one or more processors to perform a method for Internet mediation, the method comprising:
A. at a DNS server:
receiving a Domain Name System (DNS) query associated with a client, the DNS query including a domain name to be resolved; analyzing the DNS query based on predetermined criteria;
receiving a selection of a DNS policy from a policy engine;
applying the DNS policy to the DNS query;
based on the application of the DNS policy, redirecting a valid data request associated with the client to a proxy server for further mediation, said redirecting comprising:
responding to the DNS query with an IP address of a proxy server rather than with a defined IP address for the domain name;
B. at the proxy server: receiving the valid data request from the client as a result of said redirection;
receiving a selection of proxy policy from a policy engine;
applying the proxy policy to the valid data request;
based on application of the proxy policy, performing any of:
(i) loading information from a different source than the one specified in the valid data request, and providing said information to the client in response to the valid data request, and
(ii) constructing a proxy data request in response to the valid data request, sending the proxy data request to an IP address corresponding to the domain name, receiving a data response to the proxy data request, and applying the proxy policy to the data response;
C. at the policy engine:
communicating with the DNS server to select the DNS policy to apply, wherein said selection of the DNS policy comprises selecting a policy entity from a collection of policy entities, the DNS policy and the proxy policy each being part of the selected policy entity;
communicating with the proxy server to select the proxy policy to apply, wherein said selection of the proxy policy comprises selecting the policy entity from the collection of policy entities, the DNS policy and the proxy policy each being part of the selected policy entity.

* * * * *